United States Patent
Ren et al.

(10) Patent No.: US 9,471,964 B2
(45) Date of Patent: Oct. 18, 2016

(54) NON-LOCAL MEAN-BASED VIDEO DENOISING METHOD AND APPARATUS

(71) Applicants: PEKING UNIVERSITY, Beijing (CN); PEKING UNIVERSITY FOUNDER GROUP CO., LTD., Beijing (CN); BEIJING FOUNDER ELECTRONICS CO., LTD., Beijing (CN)

(72) Inventors: Jie Ren, Beijing (CN); Jiaying Liu, Beijing (CN); Zongming Guo, Beijing (CN); Yue Zhuo, Beijing (CN)

(73) Assignees: PEKING UNIVERSITY, Beijing (CN); PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/639,542

(22) Filed: Mar. 5, 2015

(65) Prior Publication Data

US 2015/0178899 A1 Jun. 25, 2015

Related U.S. Application Data

(63) Continuation of application No. PCT/CN2013/082981, filed on Sep. 5, 2013.

(30) Foreign Application Priority Data

Sep. 5, 2012 (CN) .......................... 2012 1 0326076

(51) Int. Cl.
*G06K 9/34* (2006.01)
*G06T 5/00* (2006.01)
*G06T 5/40* (2006.01)
*G06K 9/46* (2006.01)

(52) U.S. Cl.
CPC .............. *G06T 5/002* (2013.01); *G06K 9/4642* (2013.01); *G06T 5/40* (2013.01); *G06T 2207/10016* (2013.01); *G06T 2207/20021* (2013.01); *G06T 2207/20182* (2013.01)

(58) Field of Classification Search
CPC ........... G06T 5/002; G06T 5/50; G06T 5/40; G06T 2207/20182; G06T 2207/10016; G06T 2207/20021; G06K 9/46
USPC ....................................... 382/171
See application file for complete search history.

(56) References Cited

U.S. PATENT DOCUMENTS

2011/0292216 A1* 12/2011 Fergus .................. G03B 15/03
                                                                 348/164
2012/0105728 A1   5/2012 Liu (Continued)

FOREIGN PATENT DOCUMENTS

CN          1172312         2/1998
CN        101833753         5/2012

OTHER PUBLICATIONS

Ren, J. et al. "Illumination-Invariant Non-Local Means Based Video Denoising". Peking University, May 6, 2012.*

(Continued)

*Primary Examiner* — Ali Bayat
(74) *Attorney, Agent, or Firm* — Brinks Gilson & Lione

(57) ABSTRACT

The present disclosure provides a non-local mean-based video denoising method, so as to remove illumination variation in a video by using image histogram specification filtering processing. The present disclosure further provides a non-local mean-based video denoising apparatus. The apparatus comprises a filtering module used for remove illumination variation in a video by using image histogram specification filtering processing. In the present disclosure, self-adaptive adjustment can be carried out on a change of an illumination condition.

12 Claims, 4 Drawing Sheets

(56) References Cited

U.S. PATENT DOCUMENTS

2013/0121416 A1* 5/2013 He .................. H04N 19/00642
 375/240.14
2013/0163666 A1* 6/2013 Leontaris ......... H04N 19/00569
 375/240.12

OTHER PUBLICATIONS

A. Buades, B. Coll, and J.M. Morel, Denoising Image Sequences Doen Not Require Motion Estimation, Jun. 5, 2005.*

* cited by examiner

NON-LOCAL MEAN-BASED VIDEO DENOISING METHOD AND APPARATUS

CROSS-REFERENCE TO RELATED APPLICATIONS

The present application is a Continuation application of PCT International Application No. PCT/CN2013/082981, filed Sep. 5, 2013, which application claims a right of priority to Chinese Patent Application No. 201210326076.4, filed Sep. 5, 2012, both of which are incorporated herein by reference in their entirety.

TECHNICAL FIELD

This disclosure relates to the field of video processing, and more particularly, to a non-local mean-based video denoising method and apparatus.

DESCRIPTION OF THE RELATED ART

Time domain correlation presented in an image sequence may provide important priori information. In the study of digital video denosing, a non-local mean-based filtering method has been proposed by Buades et al for the reasonable use of time domain information presented in an image sequence. According to the idea of non-local mean-based method, image blocks having similar structures may separate apart from each other by a larger distance in the image space. Thus, blocks having structures similar to that of a current image block may be found in the whole image space, and weighted averaging is carried out to remove pixel noises on a center point in the current block. Many improvements, for example, in terms of calculation efficiency and rotational invariance of image blocks have been subsequently proposed based on the non-local mean-based method.

However, the inventors have found that, in those non-local mean-based methods, image pixels are directly used as local image structure features, such that it is impossible to make an adaptive adjustment to illumination variation.

SUMMARY

This disclosure is directed to a non-local mean-based video denoising method and apparatus to solve the problems described above.

In an embodiment of this disclosure, a non-local mean-based video denoising method is provided, in which illumination variation in a video is removed through image histogram specification filtering processing.

In an embodiment of this disclosure, a non-local mean-based video denoising apparatus is provided, comprising a filtering module for removing illumination variation in a video through image histogram specification filtering processing.

In the non-local mean-based video denoising method and apparatus of this disclosure, because illumination variation in a video is removed through image histogram specification filtering processing, an adaptive adjustment to variant illumination may be carried out.

BRIEF DESCRIPTION OF THE DRAWINGS

The accompanying drawings illustrated herein, which constitute part of this application, are provided for a better understanding of this disclosure. Exemplary embodiments of this disclosure and their illustration are used to explain this disclosure and are not limitations to this disclosure, in which.

DETAILED DESCRIPTION OF THE PREFERRED EMBODIMENT

Below, this disclosure will be described in detail according to embodiments with reference to accompanying drawings.

In an embodiment of this disclosure, a non-local mean-based video denoising method is provided, in which illumination variation in a video is removed through image histogram specification filtering processing.

In non-local mean-based methods according to relevant techniques, it is implicitly assumed that similar objects or structures have consistent illumination condition between image sequences. That is to say, in those traditional methods, illumination variation between video frames will have harmful effect on denoising performance. For example, the effect of a flashlight during a shooting process is omitted. Local image structures that are originally similar to each other may not be matched very well under changed illumination conditions. Thus, in the methods of relevant techniques, the direct use of image pixels as local image structure features makes it hard to carry out an adaptive adjustment, so that a lot of matched image blocks having intrinsic similar structures may be ignored.

In this embodiment, as to a video sequence with variant illumination conditions, an image histogram specification filtering process is used to improve the robustness of finding similar image blocks in frames and calculating similarity weights under variant illumination conditions, so as to realize non-local mean-based video denoising within variant illumination. This embodiment fills the blank in video denosing methods for processing a video under variant illumination conditions, which may remove noises in a video sequence in a better way, particularly in the case of variant illumination conditions, such as, affected by a flashlight during the shooting process of the video, and a better improvement in the robustness of existing video denoising methods and the visual quality of denoised images may be achieved.

Figure 3:
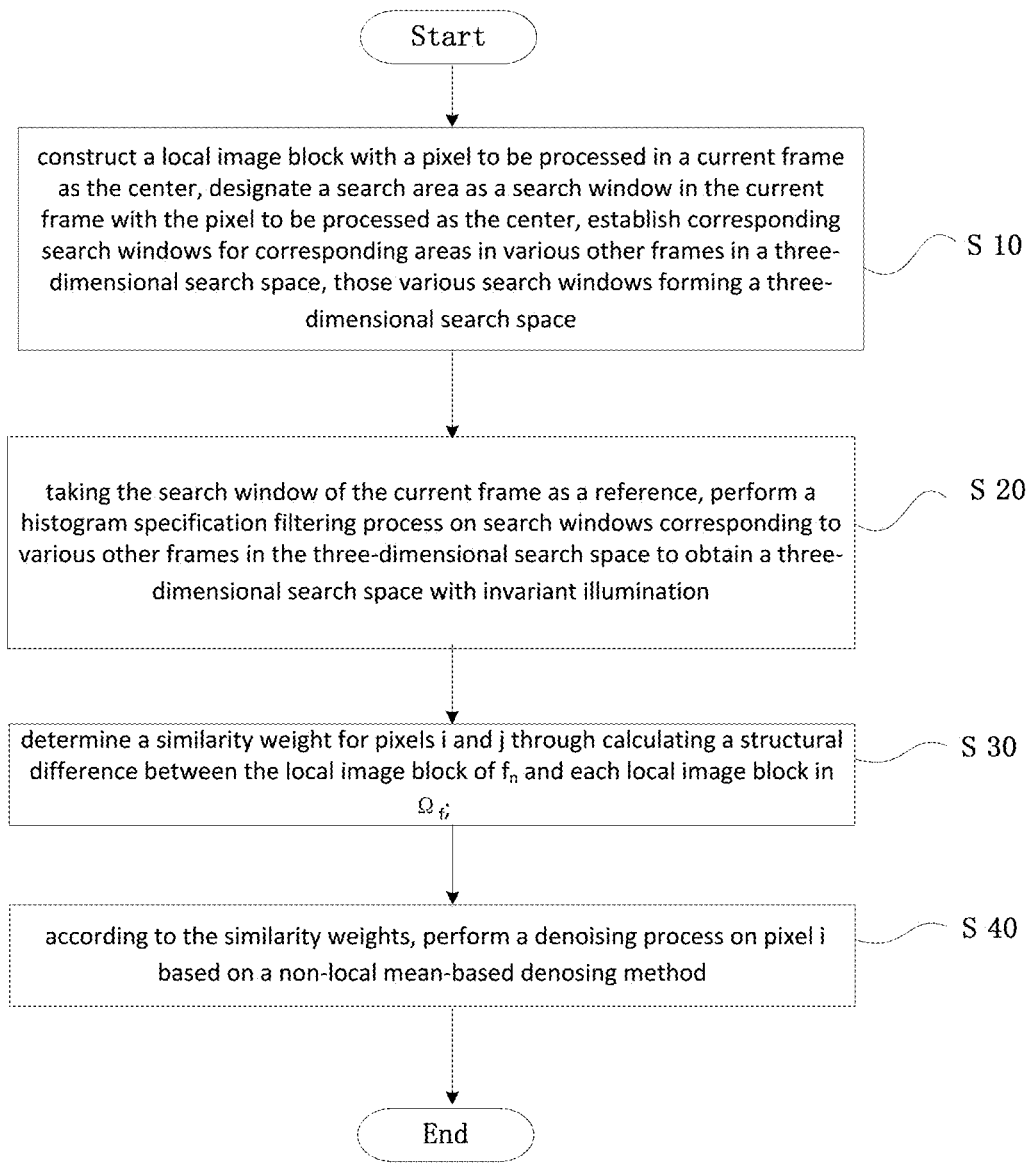
FIG. 3 shows a flowchart of a video denosing process according to an embodiment of this disclosure.

FIG. 3 shows a flowchart of a video denosing process according to an embodiment of this disclosure.

Preferably, the process of removing illumination variation in a video through image histogram specification filtering processing comprises:

At step S10, a local image block is constructed with a pixel to be processed in a current frame as the center, and a search area is designated as a search window in the current frame with the pixel to be processed as the center; corresponding search windows are established for corresponding areas in various other frames in a three-dimensional search space, those various search windows forming a three-dimensional search space;

At step S20, taking the search window of the current frame as a reference, a histogram specification filtering process is performed on search windows corresponding to various other frames in the three-dimensional search space to obtain a three-dimensional search space with invariant illumination.

In the construction of a three-dimensional search window of this preferred embodiment, taking the effect on global and local image brightness that is produced on a sequence of frames by illumination variation into consideration, an image histogram specification filtering processing method is used to eliminate match errors caused by variant illumination conditions when matching image blocks having very similar structures, so that the accuracy and robustness of image block matching and similarity weight calculation may be significantly increased, and the comprehensive performance of video denosing may be further improved.

Figure 1:
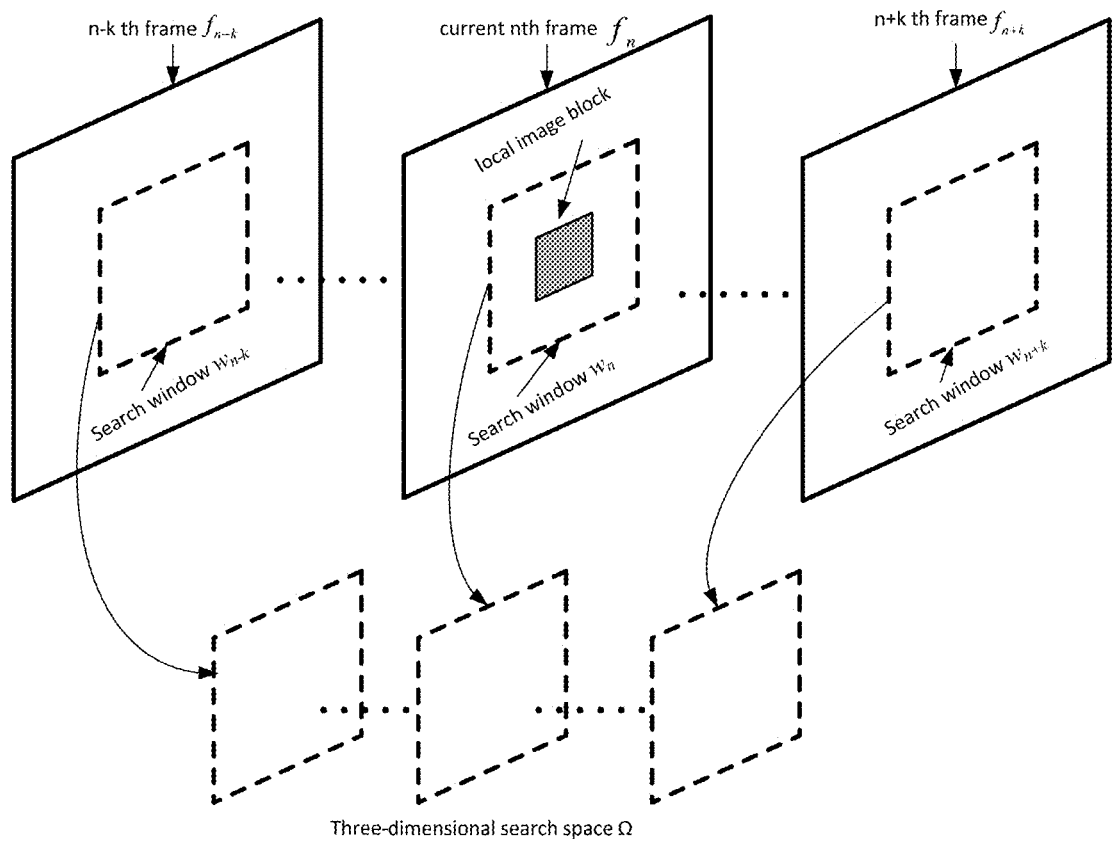
FIG. 1 is a schematic diagram showing the construction of a local image block, a search window and a search space according to an embodiment of this disclosure.
Figure 2:
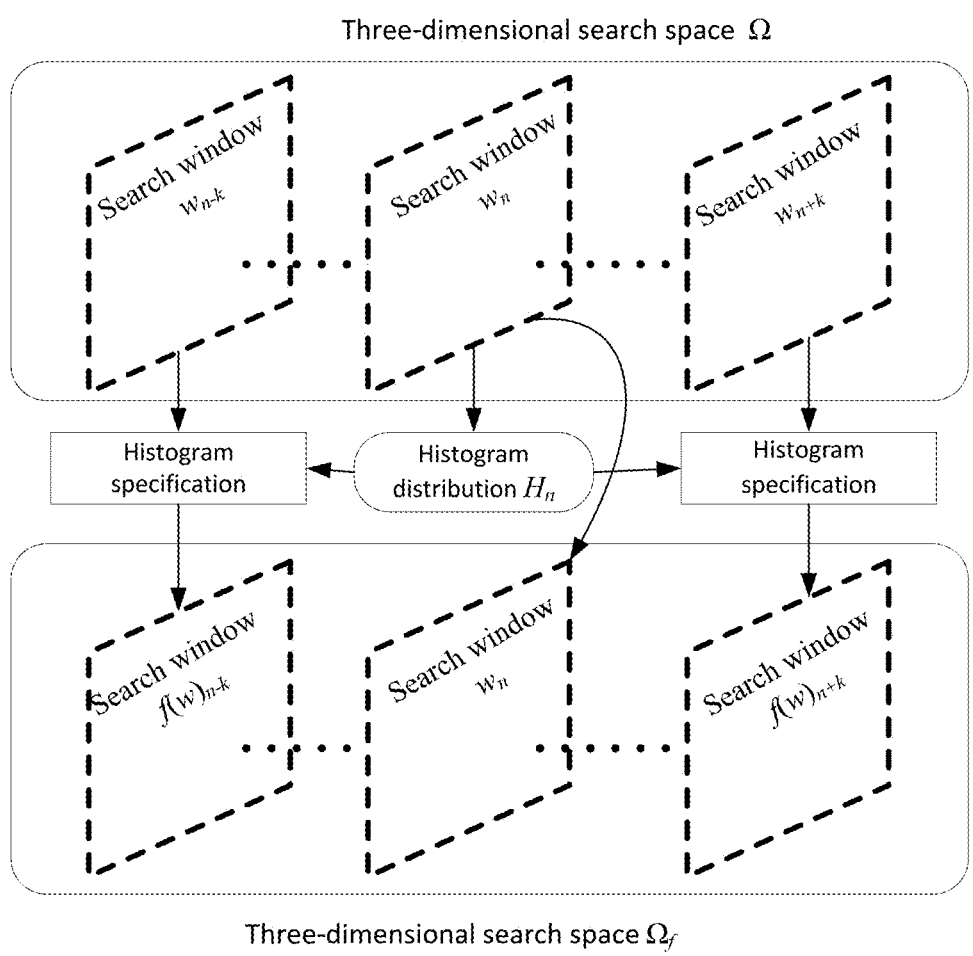
FIG. 2 is a schematic diagram of performing a histogram specification filtering process on a three-dimensional search space according to an embodiment of this disclosure.

FIG. 2 shows a schematic diagram of performing a histogram specification filtering process on a three-dimensional search space according to an embodiment of this disclosure, which comprises:

constructing a local image block with a pixel i in a frame $f_n$ as the center;

constructing a search window $w_n$ larger than the local image block with the pixel i as the center, and constructing a search window at a corresponding location in each of k preceding and succeeding frames respectively to obtain a set of search windows $\{w_{n-k}, \ldots, w_{n-1}, w_n, w_{n+1}, \ldots, w_{n+k}\}$, which forms a three-dimensional search space $\Omega$.

Preferably, the step S20 comprises:

Setting $vout_j = G^{-1}(T(vin_j))$, wherein $vin_j$ is an image value of each pixel j in a search window corresponding to another frame in the three-dimensional search space, $vout_j$ is an image value after the filtering process;

$T(v_{in}) = \int_0^{v_{in}} p_{in}(w)dw$, wherein $p_{in}(w)$ is the probability density of the histogram distribution of $vin_j$ at brightness level w;

$G^{-1}$ is the reverse function of a function G, $G(T(v_{in})) = \int_0^{T(v_{in})} p_{out}(t)dt$, $p_{out}(t)$ is the probability density of the histogram distribution of $vout_j$ at brightness level t.

In the operation of this step, an original video sequence with variant illumination is processed to substantially remove the effect of variant illumination and obtain a three-dimensional search space $\Omega_f$ with invariant illumination.

Preferably, after obtaining a three-dimensional search space $\Omega_f$ with invariant illumination, the process further comprises:

a step S30, in which a similarity weight is determined for pixels i and j through calculating a structural difference between the local image block of $f_n$ and each local image block in $\Omega_f$;

a step S40, in which according to the similarity weights, a denoising process is performed on pixel i based on a non-local mean-based denosing method.

Figure 4:
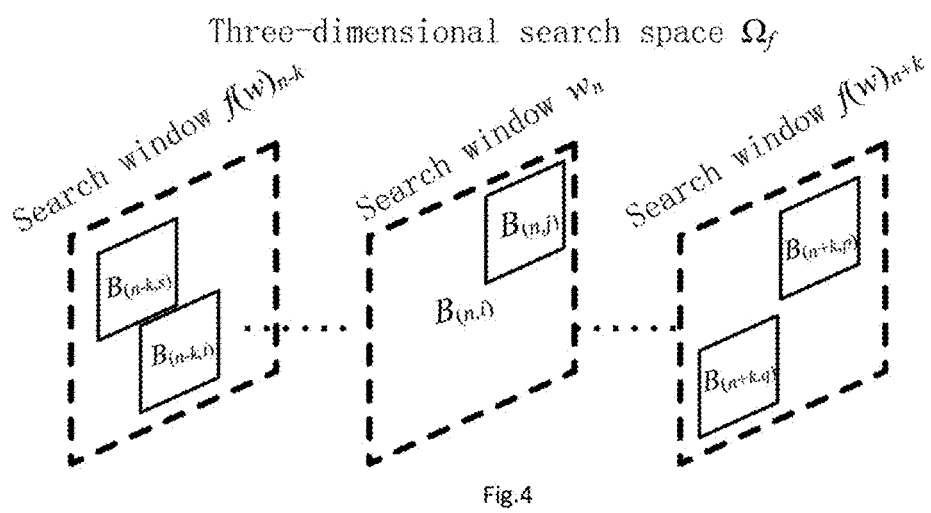
FIG. 4 shows a schematic diagram of image block matching and similarity weight calculation performed in a three-dimensional search space after a filtering process according to an embodiment of this disclosure.

FIG. 4 shows a schematic diagram of image block matching and similarity weight calculation performed in a three-dimensional search space after a filtering process according to an embodiment of this disclosure.

Preferably, the step S30 comprises:

$$w(i, j) = \frac{1}{Z(i)} \exp\left(-\frac{\|v(B_i) - v(B_j)\|_{2,a}^2}{h^2}\right)$$

Wherein, w(i, j) is the similarity weight between pixels i and j, $B_i$ and $B_j$ represent local image blocks with pixels i and j as their centers, $v(B_i)$ and $v(B_j)$ represent vectors formed by the values of pixels in the local image blocks, $\|\bullet\|_{2,a}^2$ represents measuring a weighted Euclidean distance between two vectors, wherein the symbol a represents that the spatial weight distribution is a Gaussian distribution with variance a, Exp represents the exponent function, $$Z(i) = \sum_{j \in \Omega_f} \exp\left(-\frac{\|v(B_i) - v(B_j)\|_{2,a}^2}{h^2}\right),$$

h is a constant value that is specified manually and an optimal setting thereof may be provided depending on different videos to control the property of the weight calculation.

Preferably, the step S40 comprises:

$$NL(v(i)) = \sum_{j \in \Omega_f} w(i, j)v(j)$$

NL[v(i)] is the image value of pixel i after replacement.

According to this preferably embodiment, a denoising process is performed on each pixel in the original noised image sequence according to a specified order to finally obtain a denoised image sequence, and complete the denoising process for the whole video.

In an embodiment of this disclosure, a non-local mean-based video denoising apparatus is provided, comprising a filtering module for removing illumination variation in a video through image histogram specification filtering processing, such that an adaptive adjustment to variant illumination may be carried out.

Figure 5:
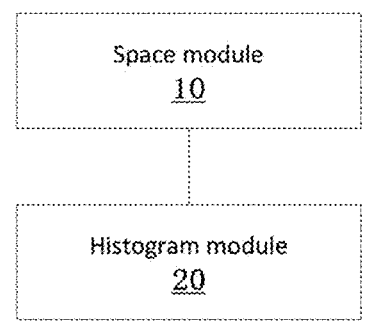
FIG. 5 shows a schematic diagram of a filtering module according to an embodiment of this disclosure.

FIG. 5 shows a schematic diagram of a filtering module according to an embodiment of this disclosure, comprising:

a space module for constructing a local image block with a pixel to be processed in a current frame as the center; designating a search area as a search window in the current frame with the pixel to be processed as the center; establishing corresponding search windows for corresponding areas in various other frames in a three-dimensional search space, those various search windows forming a three-dimensional search space;

a histogram module for taking the search window of the current frame as a reference, performing a histogram specification filtering process on search windows corresponding to various other frames in the three-dimensional search space to obtain a three-dimensional search space with invariant illumination.

Preferably, the space module is used to construct a search window $w_n$ larger than the local image block with the pixel i of frame $f_n$ as the center, and construct a search window at a corresponding location in each of k preceding and succeeding frames respectively to obtain a set of search windows $\{w_{n-k}, \ldots, w_{n-1}, w_n, w_{n+1}, \ldots, w_{n+k}\}$, which forms a three-dimensional search space $\Omega$. The histogram module is used to set $vout_j = G^{-1}(T(vin_j))$, wherein $vin_j$ is an image value of each pixel j in a search window corresponding to another frame in the three-dimensional search space, $vout_j$ is an image value after the filtering process; $T(v_{in}) = \int_0^{v_{in}} p_{in}(w)dw$, wherein $p_{in}(w)$ is the probability density of the histogram distribution of $vin_j$ at brightness level w; $G^{-1}$ is the reverse function of a function G, $G(T(v_{in}))=\int_0^{T(v_{in})} p_{out}(t)dt$, $p_{out}(t)$ is the probability density of the histogram distribution of $vout_j$ at brightness level t.

Through introducing image histogram specification filtering processing, a better use of consistency in the time domain in the video image sequence may be realized, causing a less effect of illumination variation and improving the reconstruction quality and robustness of video denoising.

Obviously, those skilled in the art may understand that various modules or steps of the present disclosure described above may be implemented by a general computing device. They may be integrated on a single computing device or may be distributed over a network composed of multiple computing devices. Optionally, they may be implemented in program code executable on a computing device, and thus they may be stored in a storage device for executing on a computing device or they may be implemented as individual IC modules, or several modules or steps thereof may be implemented in a single IC module. Therefore, this disclosure is not limited to any particular combination of hardware and software.

Preferred embodiments of this disclosure have been described above, which are not used as limitation to this disclosure. For those skilled in the art, various modifications and variations may be made to this disclosure. Any modifications, equivalents and variations are encompassed in the scope of this disclosure so long as they are in the spirit and principle of this disclosure.

What is claimed is:

1. A non-local mean-based video denoising method wherein a video includes illumination variation, the method comprising:
    removing by a processor the illumination variation in the video through image histogram specification filtering processing comprising:
    constructing a local image block with a pixel to be processed in a current frame as the center, designating a search area as a search window in the current frame with the pixel to be processed as the center, and establishing corresponding search windows for corresponding areas in various other frames in a three-dimensional search space, those various search windows forming a three-dimensional search space;
    constructing a local image block with a pixel i in a frame fn as the center; and
    constructing a search window wn larger than the local image block with the pixel i as the center, and constructing a search window at a corresponding location in each of k preceding and succeeding frames respectively to obtain a set of search windows $\{w_{n-k}, \ldots, w_{n-1}, w_n, \ldots w_{n+k}\}$, which forms a three-dimensional search space $\Omega$; and
    taking the search window of the current frame as a reference, performing a histogram specification filtering process on search windows corresponding to various other frames in the three-dimensional search space to obtain a three-dimensional search space with invariant illumination.

2. The method according to claim 1, wherein taking the search window of the current frame as a reference, performing a histogram specification filtering process on search windows corresponding to various other frames in the three-dimensional search space to obtain a three-dimensional search space $\Omega_f$ with invariant illumination comprises:

setting $vout_j = G^{-1}(T(vin_j))$,
    wherein $vin_j$ is an image value of each pixel j in a search window corresponding to another frame in the three-dimensional search space, $vout_j$ is an image value after the filtering process;
$T(v_{in}) = \int_0^{v_{in}} p_{in}(w)dw$, wherein $p_{in}(w)$ is the probability density of the histogram distribution of $vin_j$ at brightness level w;
$G^{-1}$ is the reverse function of a function G,
$G(T(v_{in})) = \int_0^{T(v_{in})} p_{out}(t)dt$, $p_{out}(t)$ is the probability density of the histogram distribution of $vout_j$ at brightness level t.

3. The method according to claim 2, wherein after obtaining a three-dimensional search space $\Omega_f$ with invariant illumination, the process further comprises:
    determining a similarity weight for pixels i and j through calculating a structural difference between the local image block of $f_n$ and each local image block in $\Omega_f$;
    according to the similarity weights, performing a denoising process on pixel i based on a non-local mean-based denosing method.

4. The method according to claim 3, wherein determining a similarity weight for pixels i and j through calculating a structural difference between the local image block of $f_n$ and each local image block in $\Omega_f$ comprises:

$$w(i,j) = \frac{1}{Z(i)} \exp\left(-\frac{\|v(B_i) - v(B_j)\|_{2,a}^2}{h^2}\right)$$

wherein, w(i, j) is the similarity weight between pixels i and j, $B_i$ and $B_j$ represent local image blocks with pixels i and j as their centers, $v(B_i)$ and $v(B_j)$ represent vectors formed by the values of pixels in the local image blocks, $\|\bullet\|_{2,a}^2$ represents measuring a weighted Euclidean distance between two vectors, wherein the symbol a represents that the spatial weight distribution is a Gaussian distribution with variance a, exp represents the exponent function, $$Z(i) = \sum_{j \in \Omega_f} \exp\left(-\frac{\|v(B_i) - v(B_j)\|_{2,a}^2}{h^2}\right),$$

h is a constant value that is specified manually and an optimal setting thereof may be provided depending on different videos to control the property of the weight calculation.

5. The method according to claim 4, wherein according to the similarity weights, performing a denoising process on pixel i based on a non-local mean-based denosing method comprises:

$$NL(v(i)) = \sum_{j \in \Omega_f} w(i,j) v(j)$$

Wherein NL[v(i)] is the image value of pixel i after replacement.

6. A non-local mean-based video denoising apparatus, wherein a video comprises an illumination variation, the apparatus comprising:
    a filtering module having a processor for removing illumination variation in the video through image histogram specification filtering processing, the filtering module comprising:

a space module for constructing a local image block with a pixel to be processed in a current frame as the center, designating a search area as a search window in the current frame with the pixel to be processed as the center, establishing corresponding search windows for corresponding areas in various other frames in a three-dimensional search space, those various search windows forming a three-dimensional search space; and a histogram module for taking the search window of the current frame as a reference, performing a histogram specification filtering process on search windows corresponding to various other frames in the three-dimensional search space to obtain a three-dimensional search space with invariant illumination, wherein the space module is used to construct a search window $w_n$ larger than the local image block with the pixel i of frame $f_n$ as the center, and construct a search window at a corresponding location in each of k preceding and succeeding frames respectively to obtain a set of search windows $\{w_{n-k}, \ldots, w_{n-1}, w_n, \ldots, w_{n+k}\}$, which forms a three-dimensional search space $\Omega$, the histogram module is used to set $vout_j = G^{-1}(T(vin_j))$, wherein $vin_j$ is an image value of each pixel j in a search window corresponding to another frame in the three-dimensional search space, $vout_j$ is an image value after the filtering process; $T(v_{in}) = \int_0^{v_{in}} p_{in}(w)dw$, wherein $p_{in}(w)$ is the probability density of the histogram distribution of $vin_j$ at brightness level w; $G^{-1}$ is the reverse function of a function G, $G(T(v_{in})) = \int_0^{T(v_{in})} p_{out}(t)dt$, $p_{out}(t)$ is the probability density of the histogram distribution of $vout_j$ at brightness level t;

wherein the filtering module, the space module, and the histogram module are provided in at least one way selected from: integrated on a single computing device; distributed over a network comprising multiple computing devices; implemented in program code executable on a computing device; stored in a storage device for execution on a computing device; implemented as individual integrated circuit modules; or implemented together on a single integrated circuit module.

7. One or more non-transitory computer-readable medium having computer-executable instructions that when loaded on a computer execute a non-local mean-based video denoising method, the method comprising:

removing by a processor illumination variation in a video through image histogram specification filtering processing, wherein constructing a local image block with a pixel to be processed in a current frame as the center, designating a search area as a search window in the current frame with the pixel to be processed as the center, and establishing corresponding search windows for corresponding areas in various other frames in a three-dimensional search space, those various search windows forming a three-dimensional search space comprises:

constructing a local image block with a pixel i in a frame $f_n$ as the center;

constructing a search window $w_n$ larger than the local image block with the pixel i as the center, and constructing a search window at a corresponding location in each of k preceding and succeeding frames respectively to obtain a set of search windows $\{w_{n-k}, \ldots, w_{n-1}, w_n, \ldots, w_{n+k}\}$, which forms a three-dimensional search space $\Omega$.

8. The computer-readable medium according to claim 7, wherein removing illumination variation in a video through image histogram specification filtering processing comprises:

constructing a local image block with a pixel to be processed in a current frame as the center, designating a search area as a search window in the current frame with the pixel to be processed as the center, and establishing corresponding search windows for corresponding areas in various other frames in a three-dimensional search space, those various search windows forming a three-dimensional search space;

taking the search window of the current frame as a reference, performing a histogram specification filtering process on search windows corresponding to various other frames in the three-dimensional search space to obtain a three-dimensional search space with invariant illumination.

9. The computer-readable medium according to claim 7, wherein taking the search window of the current frame as a reference, performing a histogram specification filtering process on search windows corresponding to various other frames in the three-dimensional search space to obtain a three-dimensional search space $\Omega_f$ with invariant illumination comprises:

setting $vout_j = G^{-1}(T(vin_j))$, wherein $vin_j$ is an image value of each pixel j in a search window corresponding to another frame in the three-dimensional search space, $vout_j$ is an image value after the filtering process;

$T(v_{in}) = \int_0^{v_{in}} p_{in}(w)dw$, wherein $p_{in}(w)$ is the probability density of the histogram distribution of $vin_j$ at brightness level w;

$G^{-1}$ is the reverse function of a function G, $G(T(v_{in})) = \int_0^{T(v_{in})} p_{out}(t)dt$, $p_{out}(t)$ is the probability density of the histogram distribution of $vout_j$ at brightness level t.

10. The computer-readable medium according to claim 9, wherein after obtaining a three-dimensional search space $\Omega_f$ with invariant illumination, the process further comprises:

determining a similarity weight for pixels i and j through calculating a structural difference between the local image block of $f_n$ and each local image block in $\Omega_f$;

according to the similarity weights, performing a denoising process on pixel i based on a non-local mean-based denosing method.

11. The computer-readable medium according to claim 10, wherein determining a similarity weight for pixels i and j through calculating a structural difference between the local image block of $f_n$ and each local image block in $\Omega_f$ comprises:

$$w(i, j) = \frac{1}{Z(i)} \exp\left(-\frac{\|v(B_i) - v(B_j)\|_{2,a}^2}{h^2}\right)$$

wherein, w(i, j) is the similarity weight between pixels i and j, $B_i$ and $B_j$ represent local image blocks with pixels i and j as their centers, $v(B_i)$ and $v(B_j)$ represent vectors formed by the values of pixels in the local image blocks, $\|\bullet\|_{2,a}^2$ represents measuring a weighted Euclidean distance between two vectors, wherein the symbol a represents that the spatial weight distribution is a Gaussian distribution with variance a, exp represents the exponent function, $$Z(i) = \sum_{j \in \Omega_f} \exp\left(-\frac{\|v(B_i) - v(B_j)\|_{2,a}^2}{h^2}\right),$$

h is a constant value that is specified manually and an optimal setting thereof may be provided depending on different videos to control the property of the weight calculation.

12. The computer-readable medium according to claim 11, wherein according to the similarity weights, performing a denoising process on pixel i based on a non-local mean-based denosing method comprises:

$$NL(v(i)) = \sum_{j \in \Omega_f} w(i, j)v(j)$$

wherein NL[v(i)] is the image value of pixel i after replacement.

\* \* \* \* \*